US011138936B2

(12) United States Patent
Kim

(10) Patent No.: US 11,138,936 B2
(45) Date of Patent: Oct. 5, 2021

(54) DISPLAY DEVICE AND METHOD OF DRIVING THE SAME

(71) Applicant: Samsung Display Co., Ltd., Yongin-si (KR)

(72) Inventor: Kyun Ho Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/793,816

(22) Filed: Feb. 18, 2020

(65) Prior Publication Data

US 2020/0302868 A1 Sep. 24, 2020

(30) Foreign Application Priority Data

Mar. 18, 2019 (KR) ........................ 10-2019-0030734

(51) Int. Cl.

*G06F 3/038* (2013.01)
*G09G 5/00* (2006.01)
*G09G 3/3258* (2016.01)

(52) U.S. Cl.

CPC ... *G09G 3/3258* (2013.01); *G09G 2320/0233* (2013.01); *G09G 2330/026* (2013.01); *G09G 2360/145* (2013.01)

(58) Field of Classification Search

CPC ............... G09G 3/3233; G09G 3/3291; G09G 2320/0295

See application file for complete search history.

(56) References Cited

U.S. PATENT DOCUMENTS

| | | | |
|---|---|---|---|
| 9,552,776 B2 | 1/2017 | Lee et al. | |
| 2009/0115795 A1 | 5/2009 | Pae et al. | |
| 2014/0028859 A1* | 1/2014 | Kim | G09G 3/30 348/189 |
| 2016/0125811 A1* | 5/2016 | Park | G09G 3/3258 345/694 |

FOREIGN PATENT DOCUMENTS

| | | |
|---|---|---|
| KR | 10-1281681 B1 | 7/2013 |
| KR | 10-1334100 B1 | 11/2013 |
| KR | 10-2014-0082503 A | 7/2014 |

* cited by examiner

*Primary Examiner* — Nan-Ying Yang
(74) *Attorney, Agent, or Firm* — Lewis Roca Rothgerber Christie LLP

(57) ABSTRACT

A display device includes a display panel including a plurality of pixels, a controller for dividing the display panel into a plurality of regions, compensating for image data provided from the outside based on a data compensation value set with respect to each of the plurality of regions, and providing the compensated image data to the display panel, and an initialization power supply for supplying an initialization power supply voltage to the display panel, wherein the data compensation value is set with respect to each of the plurality of regions of the display panel based on a difference between a target initialization power supply voltage and the initialization power supply voltage, wherein the target initialization power supply voltage is a voltage that is configured to allow any region to emit light at a target luminance with respect to image data for sensing.

14 Claims, 4 Drawing Sheets

DISPLAY DEVICE AND METHOD OF DRIVING THE SAME

CROSS-REFERENCE TO RELATED APPLICATION

This application claims priority to and the benefit of Korean Patent Application No. 10-2019-0030734, filed in the Korean Intellectual Property Office on Mar. 18, 2019, the entire content of which is incorporated herein by reference.

BACKGROUND

1. Field

Embodiments of the present disclosure relate to a display device and a method of driving the same.

2. Description of the Related Art

Each pixels of a display device includes a plurality of transistors, a storage capacitor, and an organic light-emitting element. Due to a threshold voltage deviation of the transistors, even when the same data voltage is applied, output levels of luminescence of the pixels may be different, and a stain may be visible by a user of the display device.

In order to prevent the stain, efforts may be made to compensate for a threshold voltage. However, in a large-sized display device having a high-speed driving type, it may be difficult to sufficiently compensate for threshold voltages with respect to all the pixels of a display panel.

Technology for compensating for an image through compensation of a threshold voltage deviation of a driving transistor may be utilized. However, in a display device which is large-sized and in which a high-speed driving method is utilized, it may be difficult to sufficiently compensate for threshold voltages with respect to all pixels of a display panel.

The above information disclosed in this Background section is only for enhancement of understanding of the background and therefore it may contain information that does not constitute prior art.

SUMMARY

Some example embodiments of the present disclosure may include a display device capable of precisely displaying gradation according to a data signal by compensating for a threshold voltage of driving transistors, and a method of driving the same.

Some example embodiments of the present disclosure may include a display device in which a display panel is divided into a plurality of regions according to a threshold voltage of driving transistors and the threshold voltage of the driving transistors is compensated for each region, and a method of driving the same.

It should be understood, however, that aspects of the present disclosure may be not to be limited by the foregoing characteristics, but may be variously expanded without departing from the spirit and scope of the present disclosure.

A display device according to some example embodiments includes a display panel including a plurality of pixels; a controller for dividing the display panel into a plurality of regions, compensating for image data provided from the outside based on a data compensation value set with respect to each of the plurality of regions, and providing the compensated image data to the display panel; and an initialization power supply for supplying an initialization power supply voltage to the display panel, wherein the data compensation value is set with respect to each of the plurality of regions of the display panel based on a difference between a target initialization power supply voltage and the initialization power supply voltage, wherein the target initialization power supply voltage is a voltage that is configured to allow any region to emit light at a target luminance with respect to image data for sensing.

According to some example embodiments, the controller may supply the image data for sensing and an initialization power supply voltage for sensing to the display panel and may measure the target initialization power supply voltage by analyzing luminance of an image displayed on the display panel in response to the image data for sensing and the initialization power supply voltage for the sensing.

According to some example embodiments, the controller may adjust the initialization power supply voltage for sensing to determine an initialization power supply voltage at which any pixel emits light at the target luminance to be the target initialization power supply voltage of the pixel.

According to some example embodiments, the controller may set an initialization power supply voltage at which all the pixels emit light at the target luminance to be the initialization power supply voltage.

According to some example embodiments, the controller may divide the pixels into the plurality of regions based on a level of the difference between the initialization power supply voltage and the target initialization power supply voltage.

According to some example embodiments, the plurality of regions may be classified into any one of a pixel unit, a pixel column unit, a pixel row unit, and a matrix block unit including the plurality of pixels.

According to some example embodiments, the controller may set one of a minimum value, an average value, and a maximum value of initialization power supply voltages of the plurality of pixels in the plurality of regions to be the target initialization power supply voltage.

According to some example embodiments, the image data for the sensing is black image data, and the target luminance is a black luminance.

A method of driving a display device according to some example embodiments of the present disclosure includes measuring a target initialization power supply voltage with respect to each of a plurality of pixels constituting a display panel, wherein the target initialization power supply voltage is a voltage that allows any pixel to emit light at a target luminance of any image data for sensing; dividing the display panel into a plurality of regions based on the target initialization power supply voltage; setting a data compensation value with respect to each of the plurality of regions; compensating for image data provided from the outside based on the data compensation value; and supplying the compensated image data and an initialization power supply voltage to the display panel, wherein the data compensation value is set with respect to each of the plurality of regions based on a difference between the target initialization power supply voltage and the initialization power supply voltage.

According to some example embodiments, the measuring of the initialization power supply voltage may include supplying the image data for the sensing and an initialization power supply voltage for sensing to the display panel, analyzing luminance of an image displayed on the display device in response to the image data for the sensing and the initialization power supply voltage for the sensing, and adjusting the initialization power supply voltage for the sensing to determine an initialization power supply voltage at which a pixel of the plurality of pixels emits light at the target luminance to be the target initialization power supply voltage of the pixel.

According to some example embodiments, the method may further include, after the measuring of the target initialization power supply voltage, setting an initialization power supply voltage at which the plurality of pixels emit light at the target luminance to be the initialization power supply voltage.

According to some example embodiments, the dividing of the display panel into the plurality of regions may include dividing the plurality of pixels into the plurality of regions based on a level of the difference between the initialization power supply voltage and the target initialization power supply voltage.

According to some example embodiments, the plurality of regions may be classified into any one of a pixel unit, a pixel column unit, a pixel row unit, and a matrix block unit including the plurality of pixels.

According to some example embodiments, the measuring of the target initialization power supply voltage may include setting one of a minimum value, an average value, and a maximum value of initialization power supply voltages of the plurality of pixels included in the plurality of regions to be the target initialization power supply voltage.

According to some example embodiments, the image data for the sensing may be black image data, and the target luminance may be a black luminance.

DETAILED DESCRIPTION

Figure 1:
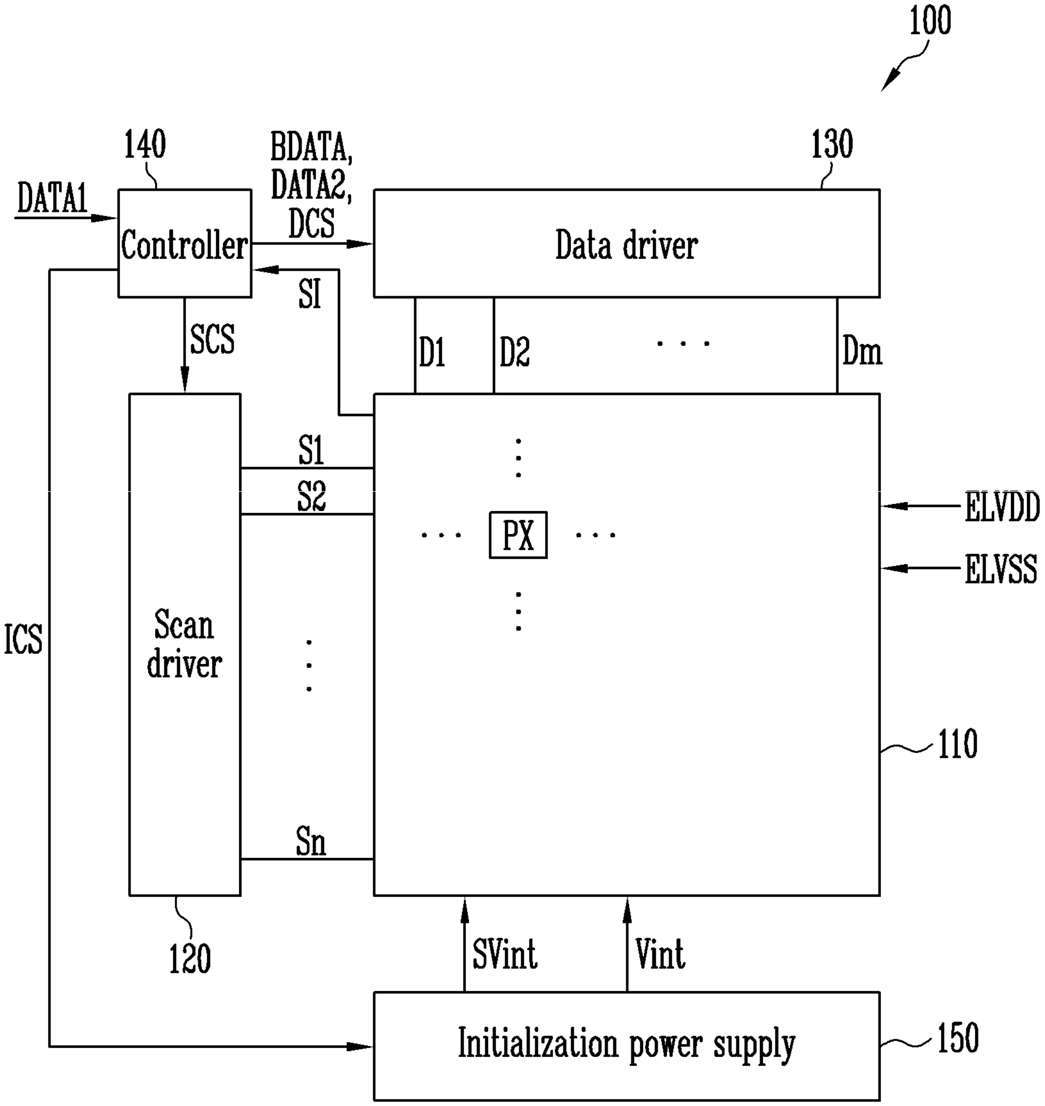
FIG. 1 is a block diagram illustrating a display device according to some example embodiments of the present disclosure.

Hereinafter, aspects of some example embodiments of the present disclosure will be described in more detail with reference to the accompanying drawings. Like reference numerals refer to like elements throughout.

FIG. 1 is a block diagram illustrating a display device according to some example embodiments of the present disclosure.

Referring to FIG. 1, a display device 100 according to some example embodiments of the present disclosure includes a display panel 110 including a plurality of pixels PX, a scan driver 120, a data driver 130, a controller 140, and an initialization power supply 150. The display device 100 may be a device configured to output an image based on image data (for example, first image data DATA1) provided from the outside. For example, the display device 100 may be an organic light-emitting display device (OLED).

The display panel 110 may include the plurality of pixels PX (or subpixels) in regions in which a plurality of scan lines S1 to Sn and a plurality of data lines D1 to Dm intersect with each other. Here, n and m may be an integer greater than or equal to two. Each of the pixels PX may emit light based on scan signals supplied to the plurality of scan lines S1 to Sn and data signals supplied to the plurality of data lines D1 to Dm. In addition, the pixels PX may receive a high potential power supply voltage ELVDD, a low potential power supply voltage EVLSS, and an initial power supply voltage Vint to the display panel 110.

A configuration of the pixel PX will be described in more detail with reference to FIG. 2.

The scan driver 120 may generate a scan signal based on a scan driving control signal SCS. That is, the scan driver 120 may supply the scan signal to the pixels PX through the scan lines S1 to Sn during a display period.

The scan driving control signal SCS may be supplied from the controller 140 to the scan driver 120. The scan driving control signal SCS may include a start pulse and clock signals. The scan driver 120 may include a shift register configured to sequentially generate scan signals corresponding to the start pulse and the clock signals.

The data driver 130 may generate a data signal based on a data driving control signal DCS and image data (for example, second image data DATA2). The data driver 130 may supply the data signal generated based on the data driving control signal DCS to the display panel 110 during a display period in one frame. That is, the data driver 130 may supply the data signal to the pixels PX through the data lines D1 to Dm. The data driving control signal DCS may be supplied from the controller 140 to the data driver 130.

According to some example embodiments of the present disclosure, black image data BDATA may be applied to the data driver 130 in order to determine a data compensation value with respect to the pixels PX of the display panel 110, before the image data (for example, the second image data DATA2) is applied to the data driver 130. The data driver 130 may transmit a data signal corresponding to the black image data BDATA to the pixels PX of the display panel 110. For example, the black image data may be image data to get the pixels PX of the display panel 110 to display black luminance.

The controller 140 may control operations of the scan driver 120, the data driver 130, and the initialization power supply 150. The controller 140 may generate the scan driving control signal SCS, the data driving control signal DCS, and an initialization control signal ICS and may control the scan driver 120, the data driver 130, and the initialization power supply 150 based on the generated signals, respectively.

According to some example embodiments of the present disclosure, in order to adaptively determine data compensation values with respect to regions of the display panel 110, the controller 140 may perform luminance sensing with respect to each of the pixels PX. Specifically, the controller 140 may supply the data signal corresponding to the black image data BDATA to the pixels PX through the data driver 130 and may supply an initialization power supply voltage for sensing SVint to the pixels PX through the initialization power supply 150.

While the data signal corresponding to the black image data BDATA is supplied, the controller 140 may determine actual luminance of each of the pixels PX with respect to the black image data BDATA from sensing information SI fed back from each of the pixels PX. While the data signal corresponding to the black image data BDATA is supplied, the controller 140 may determine a black initialization power supply voltage BVint at which actual luminance of all the pixels PX becomes target luminance corresponding to the black image data BDATA by changing the initialization power supply voltage for the sensing SVint. The controller 140 may determine the initialization power supply voltage Vint as to be a final initialization power supply voltage Vint with respect to the display panel 110. The initialization power supply voltage Vint determined by the controller 140 may later be supplied to the pixels PX through the initialization power supply 150.

According to some example embodiments, because, the characteristics of the pixels PX, for example, threshold voltages may be different, the initialization power supply voltages (for example, a black initialization power supply voltage BVint), at which the actual luminance becomes the target luminance based on the black image data BDATA, may be different according to the pixels PX. Accordingly, when the display device 100 is operated at the determined initialization power supply voltage Vint, luminance degradation may occur at the pixels PX in which the black initialization power supply voltage BVint is lower than the determined initialization power supply voltage Vint.

In the present disclosure, in order to prevent or reduce the above-described luminance degradation, a data compensation value with respect to the image data (for example, the first image data DATA1) may be determined based on a difference between the determined initialization power supply voltage Vint and the black initialization power supply voltage BVint. For example, the controller 140 may divide the display panel 110 into a plurality of regions and may determine a data compensation value corresponding to each region. Here, the data compensation value may mean an offset value that is to be applied to image data such that the pixel PX emits light at target luminance with respect to any image data.

Here, in each of the plurality of regions, the initialization power supply voltage for that region has a certain range of difference from the initialization power supply voltage Vint as determined above. The controller 140 may divide the display panel 110 into the plurality of regions based on the black initialization power supply voltage BVint of the pixels PX determined in a process of determining the above-described initialization power supply voltage Vint. According to some example embodiments, the controller 140 may determine a data compensation value based on a difference between an average black initialization power supply voltage $BVint_{ave}$, a minimum black initialization power supply voltage $BVint_{min}$, or a maximum black initialization power supply voltage $BVint_{max}$ of the pixels PX included in each region and the determined initialization power supply voltage Vint.

According to some example embodiments, the plurality of regions may be defined as a pixel row unit, a block unit including a plurality of pixel rows, a pixel column unit, a block unit including a plurality of pixel columns, or a matrix block unit including a plurality of pixel rows and a plurality of pixel columns. However, the technical spirit of the present disclosure is not limited thereto, and according to some example embodiments, the plurality of regions may be defined as a unit of the pixel PX.

The controller 140 may store the data compensation values determined with respect to the plurality of regions in the form of a lookup table (LUT) or the like. Thereafter, when the image data (for example, the first image data DATA1) is provided from the outside, the controller 140 may correct the image data based on a pre-stored data compensation value and may transmit the corrected image data (for example, the second image data DATA2) to the data driver 130. According to some example embodiments, the controller 140 may store a difference between the determined initialization power supply voltage Vint and the black initialization power supply voltage BVint of each region in the lookup table and may determine a data compensation value in real time by referring to the lookup table.

As described above, in the present disclosure, the data compensation value with respect to each of the plurality of regions on the display panel 110 may be adaptively determined based on the difference between the initialization power supply voltage Vint of the display panel 110 and the black initialization power supply voltage BVint of each of the pixels PX, thereby allowing gradation to be correctly displayed in all the pixels PX of the display panel 110 and concurrently preventing luminance degradation.

Figure 2:
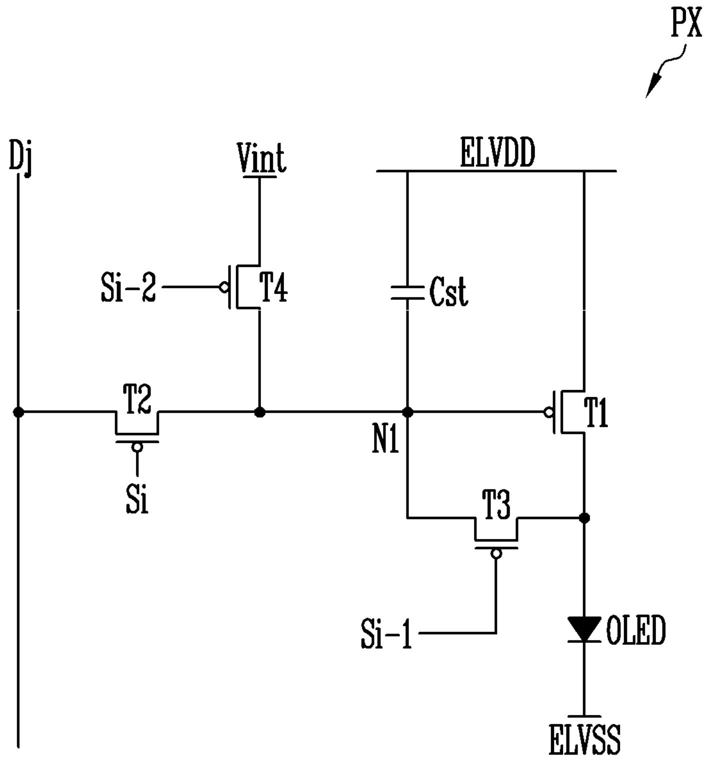
FIG. 2 is a circuit diagram illustrating an example of a pixel shown in FIG. 1.

FIG. 2 is a circuit diagram illustrating an example of the pixel shown in FIG. 1. For the convenience of description, FIG. 2 shows the pixel PX connected to an $i^{th}$ scan line Si, an $(i-1)^{th}$ scan line Si−1, an $(i-2)^{th}$ scan line Si−2, and a $j^{th}$ data line Dj.

Referring to FIG. 2, the pixel PX may include first to fourth transistors T1 to T4, a storage capacitor Cst, and an organic light-emitting diode OLED. The pixel PX may be connected to the scan driver 120 through the scan line Si (and also Si−1 and Si−2) and may be connected to the data driver 130 through the data line Dj.

An anode of the organic light-emitting diode OLED may be connected to a second electrode of the first transistor T1, and a cathode thereof may be connected to a second driving power supply ELVSS. The organic light-emitting diode OLED generates light having certain luminance in response to an amount of a current supplied from the first transistor T1.

The first transistor (e.g., a driving transistor, T1) includes a gate electrode connected to a first node N1, a first electrode connected to a high potential driving power supply voltage ELVDD supplied from the outside, and a second electrode connected to the anode of the organic light-emitting diode OLED. When the first transistor T1 is turned on, the first transistor T1 transmits a driving current, according to a data signal (or data voltage) applied to the first node N1, to the organic light-emitting diode OLED and enables the organic light-emitting diode OLED to emit light in certain luminance.

The second transistor (e.g., a switching transistor, T2) includes a gate electrode connected to the $i^{th}$ scan line Si, a first electrode connected to the data line Dj, and a second electrode connected to the first node N1. When the second transistor T2 is turned on, the second transistor T2 may transmit the data voltage according to the data signal from the data line Dj, to the first node N1 to which the gate electrode of the first transistor T1 is connected to.

The third transistor (e.g., a threshold voltage compensation transistor, T3) includes a gate electrode connected to the $(i-1)^{th}$ scan line Si−1, a first electrode connected to the first node N1, and a second electrode connected to the second electrode of the first transistor T1. The $(i-1)^{th}$ scan line Si−1 may transmits a scan signal of a previous pixel row in order to control a compensation of a threshold voltage of the first transistor T1.

According to some example embodiments, when a compensation control signal for a threshold voltage compensation is supplied to the gate electrode of the third transistor T3, a switching operation may be controlled in response to the compensation control signal. For example, before an $i^{th}$ scan signal is transmitted through the $i^{th}$ scan line Si, the third transistor T3 is turned on in response to a $(i-1)^{th}$ scan signal applied through the $(i-1)^{th}$ scan line Si−1 and diode-connects the gate electrode and the second electrode of the first transistor T1. In some embodiments, a voltage corresponding to the threshold voltage of the first transistor T1 is stored in the storage capacitor Cst. Thereafter, when a data signal is supplied, a threshold voltage pre-stored in the storage capacitor Cst and a voltage corresponding to the data signal may be supplied to the gate electrode of the first transistor T1, thereby compensating for a threshold voltage deviation.

The fourth transistor (e.g., an initialization transistor, T4) may include a gate electrode connected to the $(i-2)^{th}$ scan line Si−2, a first electrode connected to the initialization power supply voltage Vint, and a second electrode connected to the first node N1. The fourth transistor T4 may be turned on in response to a $(i-2)^{th}$ scan signal supplied to the $(i-2)^{th}$ scan line Si−2 and may apply the initialization power supply voltage Vint to the gate electrode of the first transistor T1 to initialize a previous data voltage applied to the gate electrode of the first transistor T1.

The storage capacitor Cst includes one electrode connected to the high potential power supply voltage ELVDD to which the first electrode of the first transistor T1 is connected to, and the other electrode connected to the first node N1. The storage capacitor Cst charges a voltage according to a difference between the voltages applied to both electrodes of the storage capacitor Cst. For example, the storage capacitor Cst may maintain a voltage corresponding to a difference between a voltage changed according to a change in voltage applied to the first node N1 and the high potential power supply voltage ELVDD during a certain period.

The anode of the organic light-emitting diode OLED is connected to the second electrode of the first transistor T1, and the cathode thereof is connected to a low potential driving power supply voltage ELVSS. The organic light-emitting diode OLED may emit light in response to an amount of a current flowing from the high potential power supply voltage ELVDD to the low potential driving power voltage ELVSS through the first transistor T1.

An example in which the first to fourth transistors T1 to T4 are p-type transistors is shown in FIG. 2, but the technical spirit of the present disclosure is not limited thereto. That is, according to some example embodiments, at least, some or all of the first to fourth transistors T1 to T4 may be replaced with n-type transistors, and a circuit of the pixel PX shown in FIG. 2 may be variously modified to correspond to the n-type transistors.

Figure 3:
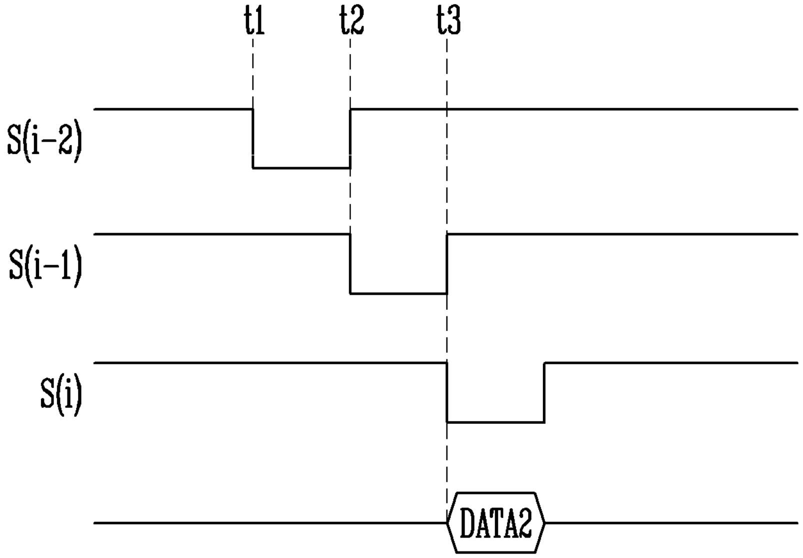
FIG. 3 is a timing diagram illustrating a driving signal input to the pixel shown in FIG. 2.

FIG. 3 is a timing diagram illustrating a driving signal input to the pixel shown in FIG. 2.

Referring to FIGS. 2 and 3 together, the $(i-2)^{th}$ scan signal (S(i−2)) having a gate-on level may be applied to the gate electrode of the fourth transistor T4 at a time t1. Then, the fourth transistor T4 is turned on, and the initialization power supply voltage Vint is applied to the first node N1.

The storage capacitor Cst is charged to a voltage value corresponding to a previous data voltage and then is gradually discharged by the initialization power supply voltage Vint applied to the other electrode of the storage capacitor Cst connected to the first node N1. That is, a charging voltage of the storage capacitor Cst is changed from a voltage corresponding to the previous data voltage to a voltage corresponding to a difference between voltages applied to both ends of the storage capacitor Cst, e.g., a voltage corresponding to a difference between the high potential power supply voltage ELVDD and the initialization power supply voltage Vint.

The $(i-1)^{th}$ scan signal (S(i−1)) having a gate-on level is applied to the gate electrode of the third transistor T3 at a time t2. When the third transistor T3 is turned on in response to the $(i-1)^{th}$ scan signal (S(i−1)), the gate electrode and the second electrode of the first transistor T1 are diode-connected. Then, the threshold voltage of the first transistor T1 is applied to the first node N1.

The storage capacitor Cst storing a voltage corresponding to the initialization power supply voltage Vint is discharged to a voltage value corresponding to the threshold voltage of the first transistor T1. A compensation time for compensating a threshold voltage in the present disclosure means a time at which the storage capacitor Cst is charged to the voltage corresponding to the initialization power supply voltage Vint at the time t1 and is discharged to the voltage corresponding to the threshold voltage of the first transistor T1 at the time t2.

The $i^{th}$ scan signal (S(i)) having a gate-on level is applied to the gate electrode of the second transistor T2 at a time t3. Then, the second transistor T2 is turned on, and a data voltage corresponding to a data signal applied to the data line Dj is transmitted to the first node N1. The storage capacitor Cst stores a voltage value corresponding to the data voltage. Here, the data voltage may be, for example, a voltage corresponding to the second image data DATA2 supplied from the controller 140.

Thereafter, when the $i^{th}$ scan signal (Si) is switched to a gate-off level, the second transistor T2 is turned off. Then, the first transistor T1 may transmit a driving current to the organic light-emitting diode OLED, wherein the driving current corresponds to a voltage corresponding to a difference between the voltages of a gate electrode and a source electrode of the first transistor T1, e.g., a voltage maintained in the storage capacitor Cst.

According to some example embodiments of the present disclosure, a data signal supplied to the pixel PX may be a signal generated based on the second image data DATA2. The second image data DATA2 may be generated by applying a data compensation value determined by the controller 140 to original image data supplied from the outside, e.g., the first image data DATA1. The data compensation value may be set with respect to each of the plurality of regions on the display panel 110 based on the difference between the initialization power supply voltage Vint of the display panel 110 and the black initialization power supply voltage BVint. That is, the data signal supplied to the pixel PX may be generated based on the second image data DATA2 generated by applying a set or predetermined data compensation value to a region including a corresponding pixel PX among the plurality of regions of the display panel 110.

Figure 4:
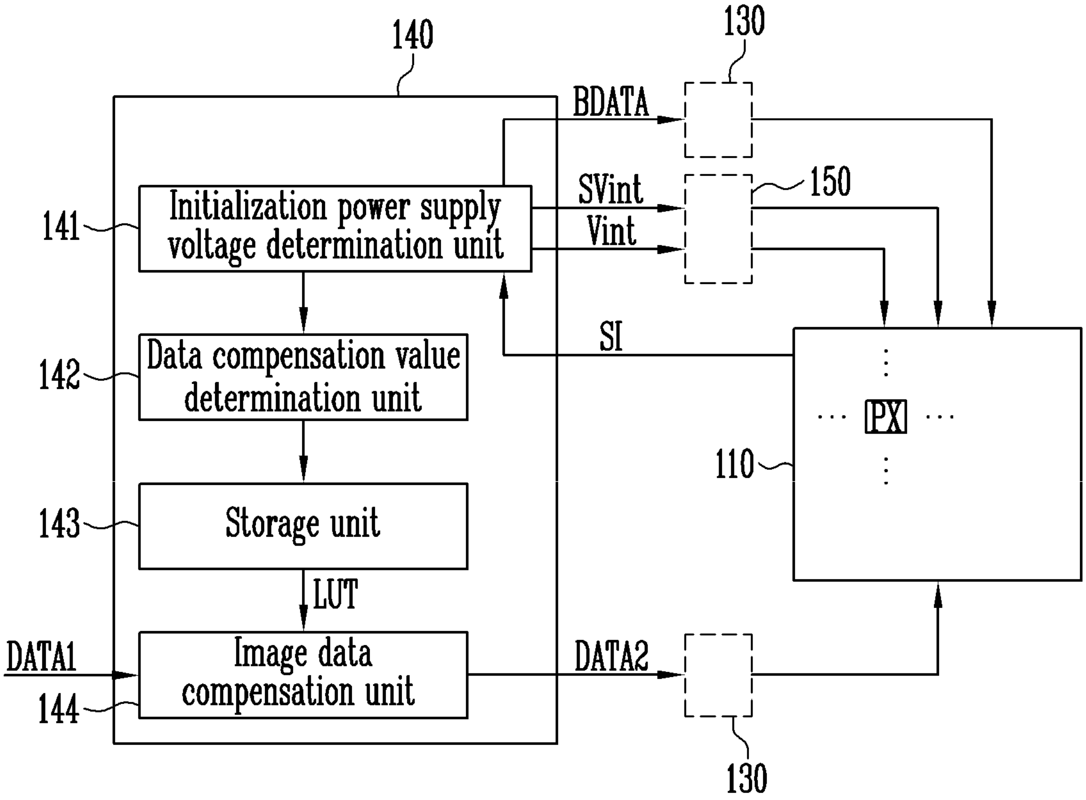
FIG. 4 is a block diagram illustrating a controller of FIG. 1 in more detail.

FIG. 4 is a block diagram illustrating the controller of FIG. 1 in more detail.

Referring to FIG. 4, the controller 140 according to some example embodiments of the present disclosure includes an initialization power supply voltage determination unit 141, a data compensation value determination unit 142, a storage unit 143, and an image data compensation unit 144.

The initialization power supply voltage determination unit 141 may be connected to the display panel 110, and may measure the black initialization power supply voltage BVint with respect to the plurality of pixels PX included in the display panel 110, and may determine an initialization power supply voltage Vint of the display panel 110 based on a measurement result.

For example, the initialization power supply voltage determination unit 141 may supply a certain data signal and an initialization power supply voltage Vint for sensing SVint, which allow the display panel 110 to display a sensing image.

The sensing image is an image having the same gradation information that allows all the pixels PX of the display panel 110 to emit light at the same certain target luminance. For example, the sensing image may be a black image, but is not limited thereto. The initialization power supply voltage determination unit 141 transmits black image data BDATA to the data driver 130, and the data driver 130 transmits a data signal corresponding to the black image data BDATA to the data lines D1 to Dm connected to the pixels PX.

The initialization power supply voltage for the sensing SVint may be transmitted equally to all the pixels PX through the initialization power supply 150 so as to initialize driving currents of the plurality of pixels PX of the display panel 110. There may be various methods of initializing the driving of the pixels PX included in the display panel 110 according to the characteristics and types of the display panel 110, and thus, a method of applying the initialization power supply voltage for the sensing SVint is not particularly limited.

According to some example embodiments of the present disclosure, when the pixels PX are self-emissive elements such as an organic light-emitting element, the initialization power supply voltage for the sensing SVint may be applied to a control element (for example, a driving transistor) to initialize a driving current transmitted to the organic light-emitting element having a certain value.

When the data signal corresponding to the black image data BDATA and the initialization power supply voltage for the sensing SVint are applied to the display panel 110, the display panel 110 may be initialized by the initialization power supply voltage for the sensing SVint and then may display a black image. The display panel 110 is driven by a driving power supply voltage which is separately supplied, initializes each of the pixels PX using the initialization power supply voltage for the sensing SVint supplied by the initialization power supply voltage determination unit 141, and then displays the black image based on the black image data BDATA.

The initialization power supply voltage determination unit 141 receives sensing information SI on the black image displayed on the display panel 110. That is, the initialization power supply voltage determination unit 141 analyzes luminance of the black image displayed by the display panel 110. While each of the pixels PX of the display panel 110 emits light, the initialization power supply voltage determination unit 141 determines a value of actual luminance with respect to target luminance (e.g., black luminance) corresponding to the black image data BDATA. The target luminance refers to luminance when the pixels PX ideally emit light according to black gradation.

The initialization power supply voltage determination unit 141 repeatedly analyzes the luminance of the display panel 110 while adjusting the initialization power supply voltage for the sensing SVint. During the repetitive analysis, all driving conditions of the display panel 110 except for the initialization power supply voltage for the sensing SVint may be maintained to be the same. The initialization power supply voltage determination unit 141 may measure a black initialization power supply voltage BVint (e.g., a target initialization power supply voltage) through a luminance analysis, where the black initialization power supply voltage BVint is a voltage at which actual luminance of each of the pixels PX becomes target luminance with respect to the black image data BDATA.

When the display panel 110 actually displays an image according to external image data, the initialization power supply voltage determination unit 141 sets the initialization power supply voltage Vint for compensating for a threshold voltage distribution of a plurality of driving transistors. The initialization power supply voltage Vint may be set to correspond to an initialization power supply voltage when the actual luminance with respect to all the pixels PX of the display panel 110 becomes the target luminance with respect to the black image data BDATA. The initialization power supply voltage Vint may have the lowest value among the black initialization power supply voltages BVint of the pixels PX, but the present disclosure is not limited thereto.

The initialization power supply voltage Vint determined by the initialization power supply voltage determination unit 141 may be supplied to the display panel 110 through the initialization power supply 150.

The data compensation value determination unit 142 may divide the display panel 110 into the plurality of regions based on the initialization power supply voltage Vint determined by the initialization power supply voltage determination unit 141 and the actual initialization power supply voltage of each of the pixels PX measured through the initialization power supply voltage determination unit 141. The data compensation value determination unit 142 may determine a data compensation value corresponding to each of the divided regions.

According to some example embodiments, because the threshold voltage characteristics of the driving transistors of the pixels PX in the display panel 110 are different from each other, a gradation stain may occur in the black image according to the black image data BDATA. Accordingly, a deviation may occur between the black initialization power supply voltage BVint of each of the pixels PX and the set initialization power supply voltage Vint.

The data compensation value determination unit 142 may determine a certain critical range with respect to the initialization power supply voltage Vint. When the black initialization power supply voltage BVint deviates from the critical range, the data compensation value determination unit 142 may group corresponding pixels PX into pixel units, pixel row units, pixel column units, or matrix block units. That is, the data compensation value determination unit 142 classifies a level of a difference between the actual black initialization power supply voltage and the set initialization power supply voltage Vint, and groups the pixels PX into certain groups. The data compensation value determination unit 142 treats a level of a difference between the black initialization power supply voltage BVint and the set initialization power supply voltage Vint of the pixel PX belong to each of the certain groups as being similar to each other.

The data compensation value determination unit 142 may determine a data compensation value of a corresponding region for each group, e.g., each region. That is, when the display panel 110 is driven at the set initialization power supply voltage Vint, the data compensation value determination unit 142 may determine an offset value (voltage value) to be applied to the image data such that the pixel PX that emits light at target luminance with respect to any image data.

The storage unit 143 may store the data compensation value for each region determined by the data compensation value determination unit 142 in the form of a lookup table. According to some example embodiments, the storage unit 143 may store a difference between the determined initialization power supply voltage Vint and the black initialization power supply voltage BVint of each region in the lookup table or the like.

When the first image data DATA1 is received from the outside, the image data compensation unit 144 may generate the second image data DATA2 by correcting the first image data DATA1 based on the data compensation value stored in the storage unit 143. The image data compensation unit 144 may obtain a data compensation value from the lookup table so as to correspond to the region of the display panel 110 in which the first image data DATA1 is to be displayed. The image data compensation unit 144 may generate the second image data DATA2 by applying the obtained data compensation value to the first image data DATA1.

According to some example embodiments, when the storage unit 143 stores the difference between the initialization power supply voltage Vint and the black initialization power supply voltage BVint of each region in a lookup table, the image data compensation unit 144 may determine a data compensation value in real time based on a difference value obtained from the lookup table and may also generate the second image data DATA2 using the determined data compensation value.

The storage unit 143 is shown in FIG. 4 as being a component provided in the controller 140, but the technical spirit of the present disclosure is not limited thereto. That is, according to some example embodiments, the storage unit 143 may be provided separately from the controller 140 in the display device 100 or may be separately provided outside the display device 100.

Figure 5:
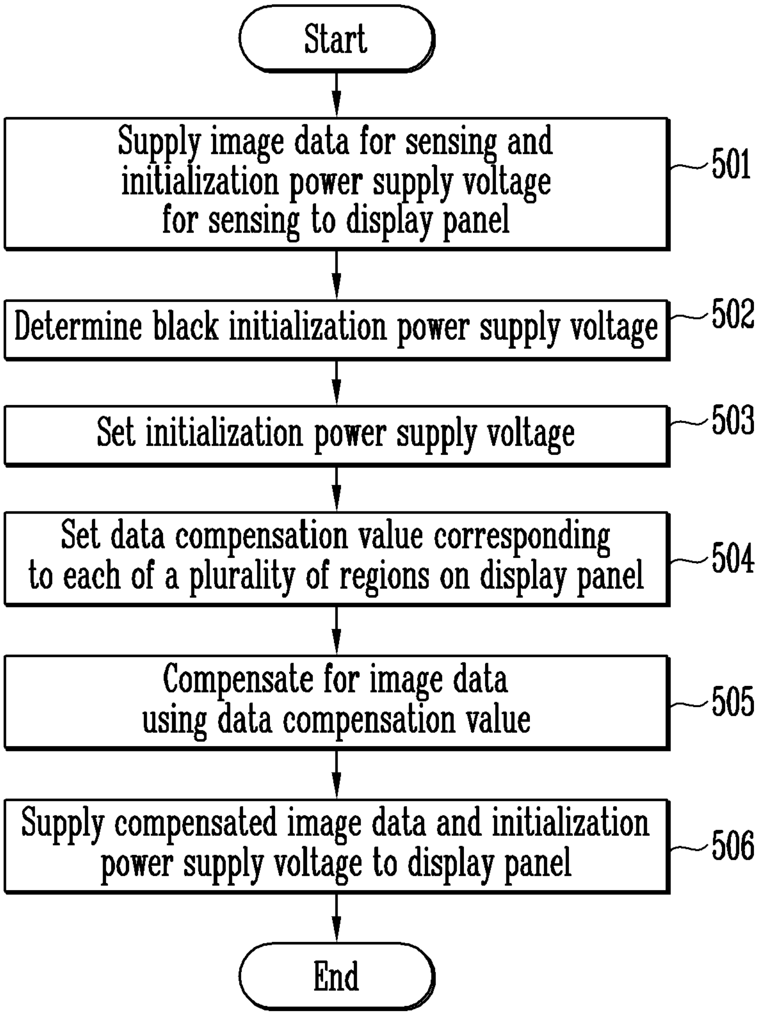
FIG. 5 is a flowchart of a method of driving a display device according to some example embodiments of the present disclosure.

FIG. 5 is a flowchart of a method of driving a display device according to some example embodiments of the present disclosure.

Referring to FIG. 5, a display device 100 may provide image data for sensing and an initialization power supply voltage for the sensing SVint to a display panel 110 (501). According to some example embodiments, the image data for the sensing may be black image data BDATA.

As the black image data BDATA and the initialization power supply voltage for the sensing SVint are supplied, the display panel 110 may display a black image. At this time, the display device 100 may perform a luminance analysis with respect to the display panel 110 to determine a black initialization power supply voltage BVint with respect to pixels PX (502). For example, the display device 100 may measure a black initialization power supply voltage BVint at which actual luminance of the display panel 110 becomes black luminance while adjusting the initialization power supply voltage for the sensing SVint supplied to the display panel 110.

The display device 100 may set an initialization power supply voltage Vint of the display panel 110 based on the black initialization power supply voltage BVint measured with respect to the pixels PX (503). For example, the display device may set the initialization power supply voltage when the actual luminance of all the pixels PX of the display panel 110 becomes the black luminance to be the final initialization power supply voltage Vint. According to some example embodiments, the initialization power supply voltage Vint may have the lowest value among the black initialization power supply voltages BVint of the pixels PX, but the present disclosure is not limited thereto.

The display device 100 may set a data compensation value corresponding to each of a plurality of regions on the display panel 110 (504) based on a difference between the black initialization power supply voltage BVint measured with respect to the pixels PX and the set initialization power supply voltage Vint. The display device 100 may divide the display panel 110 into the plurality of regions according to the difference between the black initialization power supply voltage BVint measured with respect to the pixels PX and the set initialization power supply voltage Vint. The display device 100 may set a data compensation value of each region according to the difference between the black initialization power supply voltage BVint and the initialization power supply voltage Vint with respect to each region. According to some example embodiments, the display device 100 may store the set data compensation value of each region in a lookup table or the like.

The display device 100 may compensate for image data input from the outside using the set data compensation value (505). For example, the display device 100 may determine whether a pixel PX on which corresponding image data is to be displayed is included in any region among the plurality of regions of the display panel 110 and may compensate for image data by applying a preset data compensation value corresponding to the corresponding region to the image data.

The display device 100 may supply the compensated image data and the initialization power supply voltage Vint to the display panel 110 (506). As described above, in the present disclosure, image data is compensated to correspond to the difference between the initialization power supply voltage Vint applied to the display panel 110 and the actual black initialization power supply voltage BVint of each region of the display panel 110, thereby preventing or reducing luminance degradation caused by a threshold voltage deviation of the pixels PX to display a high-quality image.

According to a display device and a method of driving the display device according to the present disclosure, it is possible to effectively compensate for a threshold voltage deviation of driving transistors of pixels included in a display panel of the display device.

In addition, according to a display device and a method of driving the display device according to the present disclosure, it is possible to improve image of the display device which is large-sized and driven at high speed without adding new components.

Those of ordinary skill in the art to which the present disclosure belongs may understand that the present disclosure may be embodied in other specific forms without departing from the spirit or essential characteristics thereof. It is therefore to be understood that the above-described example embodiments are illustrative in all aspects and not restrictive. The scope of the present disclosure is defined by the claims set forth below rather than by the above detailed description. All changes or modifications that come within the meaning and range of the claims and the equivalents thereof are to be construed as being included within the scope of the present disclosure.

It will be understood that, although the terms “first”, “second”, “third”, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as “beneath”, “below”, “lower”, “under”, “above”, “upper” and the like, may be used herein for ease of description to describe one element or feature’s relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

What is claimed is:

1. A display device comprising:

a display panel comprising a plurality of pixels;

a controller configured to divide the display panel into a plurality of regions, compensate for image data provided from the outside based on a data compensation value set with respect to each of the plurality of regions, and provide the compensated image data to the display panel; and an initialization power supply configured to supply an initialization power supply voltage to the display panel, wherein the data compensation value is set with respect to each of the plurality of regions of the display panel based on a difference between a target initialization power supply voltage and the initialization power supply voltage, wherein the target initialization power supply voltage is a voltage that is configured to allow any region to emit light at a target luminance with respect to image data for sensing, and wherein the controller is configured to determine the data compensation value based on a difference between an average black initialization power supply voltage, a minimum black initialization power supply voltage, or a maximum black initialization power supply voltage of pixels in each of the plurality of regions and the initialization power supply voltage.

2. The display device of claim 1, wherein the controller is configured to supply the image data for sensing and the initialization power supply voltage for sensing to the display panel and measure the target initialization power supply voltage by analyzing luminance of an image displayed on the display panel in response to the image data for sensing and the initialization power supply voltage for the sensing.

3. The display device of claim 2, wherein the controller is further configured to adjust the initialization power supply voltage for sensing to determine a power supply voltage at which a pixel emits light at the target luminance to be the target initialization power supply voltage of the pixel.

4. The display device of claim 3, wherein the controller is configured to set the initialization power supply voltage at which all the pixels emit light at the target luminance to be the initialization power supply voltage.

5. The display device of claim 4, wherein the controller is configured to divide the pixels into the plurality of regions based on a level of the difference between the initialization power supply voltage and the target initialization power supply voltage.

6. The display device of claim 5, wherein the plurality of regions are classified into any one of a pixel unit, a pixel column unit, a pixel row unit, and a matrix block unit comprising the plurality of pixels.

7. The display device of claim 1, wherein the image data for the sensing is black image data, and the target luminance is a black luminance.

8. A method of driving a display device, the method comprising:

measuring a target initialization power supply voltage with respect to each of a plurality of pixels constituting a display panel, wherein the target initialization power supply voltage is a voltage that allows any pixel to emit light at a target luminance of any image data for sensing;

dividing the display panel into a plurality of regions based on the target initialization power supply voltage;

setting a data compensation value with respect to each of the plurality of regions;

compensating for image data provided from the outside based on the data compensation value; and supplying the compensated image data and an initialization power supply voltage to the display panel, wherein the data compensation value is set with respect to each of the plurality of regions based on a difference between the target initialization power supply voltage and the initialization power supply voltage, and wherein the data compensation value is determined based on a difference between an average black initialization power supply voltage, a minimum black initialization power supply voltage, or a maximum black initialization power supply voltage of pixels in each of the plurality of regions and the initialization power supply voltage.

9. The method of claim 8, wherein the measuring of the initialization power supply voltage comprises:

supplying the image data for the sensing and the initialization power supply voltage for sensing to the display panel, analyzing luminance of an image displayed on the display device in response to the image data for the sensing and the initialization power supply voltage for the sensing, and adjusting the initialization power supply voltage for the sensing to determine a power supply voltage at which a pixel of the plurality of pixels emits light at the target luminance to be the target initialization power supply voltage of the pixel.

10. The method of claim 9, further comprises:

after the measuring of the target initialization power supply voltage, setting the initialization power supply voltage at which the plurality of pixels emit light at the target luminance to be the initialization power supply voltage.

11. The method of claim 10, wherein the dividing of the display panel into the plurality of regions comprises:

dividing the plurality of pixels into the plurality of regions based on a level of the difference between the initialization power supply voltage and the target initialization power supply voltage.

12. The method of claim 11, wherein the plurality of regions are classified into any one of a pixel unit, a pixel column unit, a pixel row unit, and a matrix block unit comprising the plurality of pixels.

13. The method of claim 11, wherein the measuring of the target initialization power supply voltage comprises:

setting one of a minimum value, an average value, and a maximum value of initialization power supply voltages of the plurality of pixels included in the plurality of regions to be the target initialization power supply voltage.

14. The method of claim 8, wherein the image data for the sensing is black image data, and the target luminance is a black luminance.

* * * * *